Aug. 14, 1951 W. F. KANNENBERG 2,564,437

AUTOMATIC VOLUME CONTROL

Filed Nov. 26, 1949 2 Sheets-Sheet 1

INVENTOR
W. F. KANNENBERG
BY
D. MacKenzie
AGENT

Aug. 14, 1951 W. F. KANNENBERG 2,564,437

AUTOMATIC VOLUME CONTROL

Filed Nov. 26, 1949 2 Sheets-Sheet 2

INVENTOR
W. F. KANNENBERG
BY
D. MacKenzie
AGENT

Patented Aug. 14, 1951

2,564,437

UNITED STATES PATENT OFFICE 2,564,437

AUTOMATIC VOLUME CONTROL

Walter F. Kannenberg, Gillette, N. J., assignor to Bell Telephone Laboratories, Incorporated, New York, N. Y., a corporation of New York Application November 26, 1949, Serial No. 129,595

11 Claims. (Cl. 179—1)

This invention relates to an automatic volume control for controlling the output volume of sound distributed in a listening area in accordance with the ambient noise level in that area. This improved volume control is of the interval-adjusting type. During the interval between successive renditions of program material the ambient noise level in the area is tested and the gain of the program channel set in accordance with the findings of this test, the operations indicated being performed automatically. Correction of program level proceeds in accordance with a weighted measurement of noise level, so that the output volume of program sound will be at all times pleasing to the ear, irrespective of the level of noise in the room.

The invention is of particular use in cocktail lounges or restaurants, where intermittent music of suitable character and carefully controlled level has been found to stimulate business. In such places noise level varies over wide ranges depending on the size of the crowd in terms of percentage of full capacity, and the necessity of frequent monitoring of noise and corresponding readjustment of program levels is therefore indicated if the music furnished is to maintain its role of subtle stimulant.

One object of the invention is to provide an improved volume control.

Another object is to provide an automatic volume control for maintaining the sound output of a group of loudspeakers at a pleasing level with respect to room noise.

Another object is to provide a multistage amplifier with automatic means for making a test and readjusting its properties in conformance with the results thereof.

Another object is to provide in a sound program system a multistage amplifier whose output level will be controlled by an extraneous sound source.

A feature of the invention is the adaptation of commercially available potentiometers to the purpose of the invention.

Another feature of the invention is the provision of a novel arrangement of commercially available relays to control the sequence of operations during each cycle including a correcting interval followed by a program interval.

Another feature of the invention is the provision of means for maintaining constant, during the correcting interval, the amplified unidirectional voltage representative of the noise level in the listening area by varying the amplification of the voltage, decreasing it proportionally to the noise level increase and concomitantly therewith oppositely varying the amplification of the sound program voltage.

The invention makes use of a commercial reproducer of disc sound records with record changer. One such record may contain four selections each about six minutes long; equally long intervals may be allowed for gain control after playings, so that a single record may furnish forty-eight minutes of operation. It will be assumed that such a record reproducer and a record changer are at hand, so that particular description of those elements may be omitted.

The invention will be understood from the following description of a preferred embodiment thereof, read with reference to the accompanying drawings in which.

Power supplies for the various parts of the system are understood but not shown.

Figure 1:
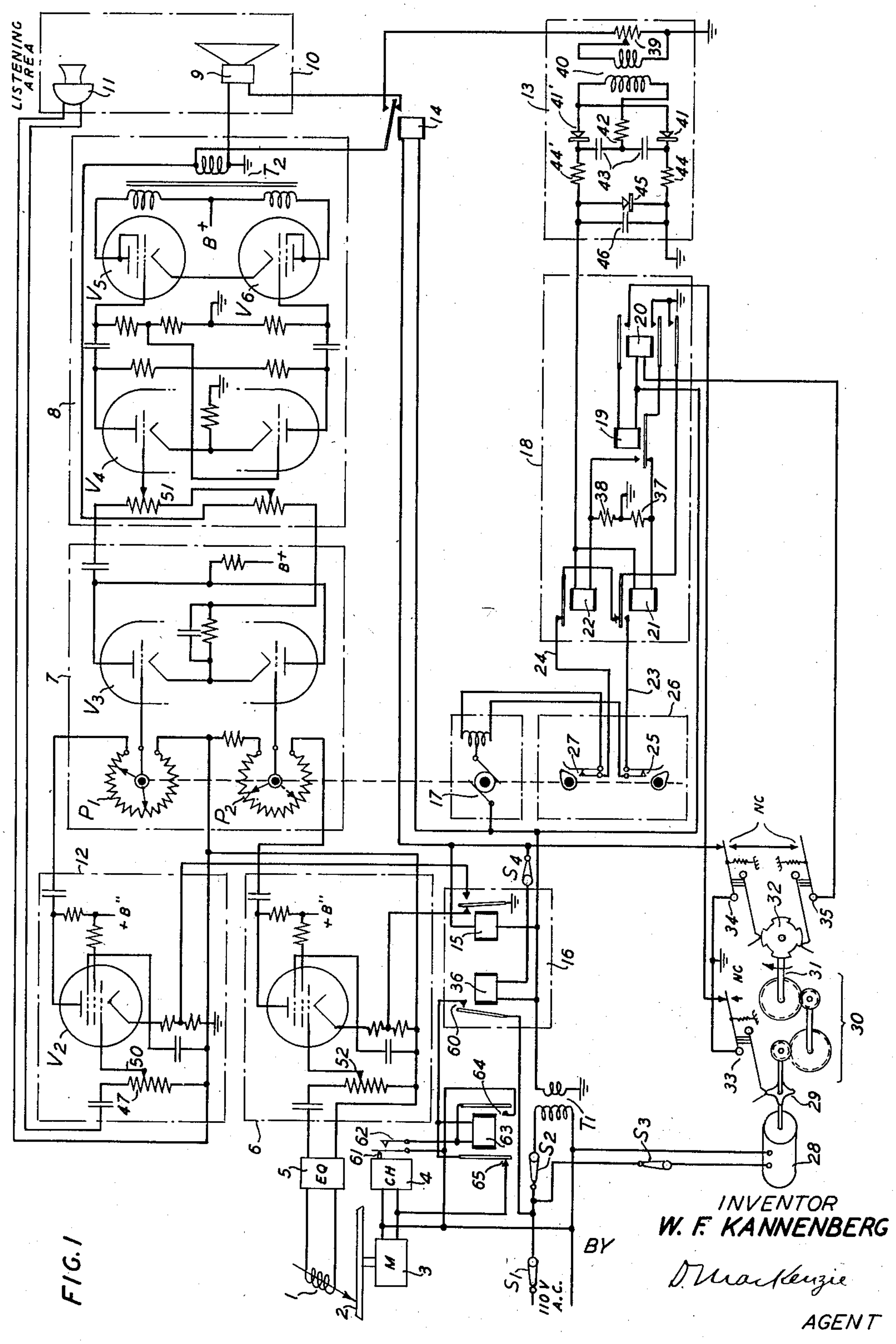
Fig. 1 shows a circuit schematic of the apparatus of the invention.

Referring to Fig. 1, 1 represents a phonograph pick-up delivering at its output terminals a varying voltage in accordance with movements of its stylus in tracking the record groove modulations of a phonograph record being rotated by turntable 2 under motive power of motor 3. 1, 2 and 3 are parts of a record changer, whose mechanism 4 changes records when required in customary manner, except that for the purpose at hand it is preferred to add a relay and momentary contact switch in such manner that mechanical movement of the changer mechanism in placing a new record on the turntable will trip the switch, pulling up the relay which will hold on a back contact and at the same time disconnect power from the turntable and changer device until the power circuit has been opened first and then reapplied afresh. This operation will be later described. The electrical output of pick-up 1 passes through equalizer 5 into preamplifier 6, is further amplified in intermediate amplifier 7, feeding into power amplifier 8 to supply program signals at ample power to loudspeaker array 9 in listening area 10.

Listening area 10 also contains microphone 11 for the purpose of sampling noise during a no-program interval. Its electrical output feeds into a second preamplifier 12 and thence into intermediate amplifier 7 and power amplifier 8 as before. During the sampling period, then, the output of amplifier 8 must be diverted to rectifier 13 by relay 14. Likewise during the noise sampling period preamplifier 12 is activated, whereas during a program rendition period preamplifier 6 is activated. Activation is accomplished by relay 15, of auxiliary group 16, by switching ground from one amplifier to the other. Activation results from application of ground to a tap on the corresponding cathode resistor which acts to short out a portion thereof; when the resistor is partially shorted, bias is at normal operating value; when the resistor is not partially shorted, bias amounts to tube cut-off value. Relays 14 and 15, therefore, permit the same identical amplifiers 7 and 8, to serve both the program channel and the microphone or noise-test channel in turn.

Adjustment of channel gains, if and when required, takes place in intermediate amplifier 7. This is a single mixer-type stage. Each of the channels in the input side of this stage contains an electrically separate potentiometer. These potentiometers $P_1$ and $P_2$ are mechanically coupled together and to reversible motor 17 in such manner that increasing the gain in one channel decreases gain in the other. The microphone channel potentiometer is arranged to vary gain over a range of 25 decibels in uniform gain increments for equal increments of rotation. The program channel potentiometer is selected and arranged to vary gain in a preferred manner over a range of 15 decibels or so in the precisely same angle of shaft rotation. The precise manner in which this may be done, using ordinary commercially available potentiometers is left for a later paragraph.

Movement of gain adjusting motor 17 is determined by control relay group 18, comprising four relays 19, 20, 21 and 22. Of these four relays the latter two are motor control relays. They receive their power directly from noise rectifier 13, and perform in accordance with conditions determined by auxiliary control relays 19 and 20. When relay group 18 places ground on lead 23, motor 17 will turn in a direction to decrease gain in the microphone channel (and simultaneously will increase gain in the program channel). When all permissible or available correction in this direction has been taken, end stop watch 25 will open the corresponding motor circuit through action of an adjustable cam on the shaft which couples the slow speed shaft of motor 17 to the potentiometers and to end-stop arrangement 26. Similarly, when relay group 18 places ground on lead 24, motor 17 will turn in a direction to increase microphone channel gain (and decrease program channel gain). When all permissible or available correction in the present direction has been taken, end-stop switch 27 of end-stop arrangement 26 will be actuated to open its corresponding motor circuit through action of its associated adjustable cam on the coupling shaft. In this manner at either end of the range of shaft rotation the appropriate part of the motor circuit is opened up to prevent tractive effort on the part of the motor 17 beyond the desired useful range of the potentiometers. Motor 17 is of the three-wire type, and may well be of the tapped field, commutator variety as shown on Fig. 1. In this case current flows through the armature and selectively through either half of the field winding, depending on whether lead 23 or lead 24 is grounded. This selection reverses polarity of the instantaneous field with respect to that of the armature, thereby achieving the desired reversal of rotation.

In the described system correction is achieved by automatically adjusting the microphone or noise test channel gain for constant output of amplified noise. During a noise test interval the integrated output of rectifier 13 delivers to control relay group 18 a value of direct-current voltage which in the range of interest is proportional to average noise in the listening area. When a voltage of predetermined reference value is supplied to group 18, motor 17 will not be ordered to move in either direction. When a larger or smaller value happens to be supplied to group 18, a resulting application of ground to either lead 23 or lead 24 will call upon motor 17 to turn in such direction as will affect microphone channel gain in the manner required to restore reference value of input to group 18 from rectifier 13. Correction of program level accordingly is incidental, except that it is proportioned to occur in desired manner by detailed design.

Sequence of switching from noise test or sampling to program rendition and the time allocated to each period is determined by a timer motor 28 carrying cam 29 and geared by gear train 30 to shaft 31 carrying cam 32. Timer motor 28 may be a Telechron running at one revolution per minute, with use of a reduction ratio in train 30 of 48:1; shaft 31, therefore, turns once in forty-eight minutes. Cam 29 is a four-pronged unit which engages microswitch 33, producing a contact closure for about one second in each fifteen-second interval. Cam 32 is shaped so that switch 34 actuated thereby is closed 50 per cent of the time (closed six minutes, open six minutes). Switch 35 is staggered with respect to switch 34 by 22½ degrees in a rotationally lagging direction and in such manner that its NC (normally closed) contacts will not close until three minutes after closure of the NC contacts of switch 34. The normally closed (NC) contacts are the lower contacts of switches 33 and 34 and the upper contacts of switch 35; in each case, the opposite contact is normally open (NO). Thus, wiring the NC contact spring of switch 34 via the switch lever and NC contact terminals of switch 35 to the winding of relay 20 will result in relay 20 being operated only for the three minutes (out of every twelve-minute cycle) which comprises the last half of the interval during which relay 14 and the relays of group 16 are in their released position. The latter in being released specify the six-minute noise test and adjust period, and by being operated throughout the following six minutes thereby specify the program rendition period.

Relay group 16 contains also relay 36 which, when operated, closes the power circuit to the record playing mechanism, and opens the power circuit thereto when relay 36 drops down during the noise test and adjust interval. When ground is applied through switch 34 to relay 36, contact 60 is closed, completing the power circuit to motor 3 and record changer 4. When the record on turntable 2 is ended and record changer 4 operates to place a new record in position, it is arranged (by modification not shown of the record changer mechanism) that just before the reproducer 1 is allowed to engage the new record, pin 61 shall be momentarily driven to close contact 62. This closure applies power, relay 36 being still energized, from the alternating-current source directly to the winding of relay 63. Thereupon, contact 64 is closed, shorting contact 62, and keeping relay 63 energized until contact 60 next opens. At the same time contact 65 opens, thereby opening the power circuit to motor 3 and changer 4 despite the continued closure of contact 60. Presently, cam 32 allows switch 34 to open, releasing relay 36 and therewith relay 63. The motor and record changer remain disabled until, at the end of the noise-sampling period, cam 32 again operates switch 34 to reenergize relay 36. Contacts 64 and 65 being now open and closed, respectively, power is again applied to the motor and record changer and the new program begins.

Relays 14, 15 and 36 are ordinary alternating-current relays and may be Allied type B relays. One side of the winding of each alternating-current relay is permanently wired to one side of the low voltage winding of a step-down power transformer $T_1$, the other side of which is grounded, so that a ground applied to the remaining winding end of any alternating-current relay will cause it to operate.

According to the sequence established by the described timing arrangement, as soon as the program interval has been terminated and the noise test interval begun, ground switched by the release of relay 15 to the mid-point of the cathode resistor of preamplifier 12 of the microphone channel reactivates that amplifier and connects transformer $T_2$ to potentiometer 39, so that development of a direct-current voltage proportional to average listening area noise can proceed at the output side of rectifier 13. This voltage does not reach proportionality quickly, and accordingly functioning of control relay group 18 is delayed for three minutes to allow thorough establishment of the proportional relation. At the halfway mark, then, of the noise test interval relay 20 of the control group is allowed to operate as previously described, permitting the control group to initiate corrective changes in accordance with the magnitude of direct-current voltage delivered thereto. As such correction takes place, the resulting microphone channel gain adjustment will change the delivered direct-current voltage towards reference value, at which no corrective effort is called for. However, if during this time interval room noise also changes, the direct-current voltage will thus change as well, so that eventual correction takes cognizance of such change and therefore corrects for noise as it exists right up to the time immediately preceding the following program rendition.

The manner in which the delivered direct-current voltage is translated into orders to motor 17 to rotate in one direction or the other, or not at all, is of particular interest because ordinary plate-current relays having a normally wide differential between operate and release are used in a novel circuit which permits them nevertheless to act selectively on inputs differing by only a few per cent. These relays are indicated in group 18 by numbers 21 and 22, and may suitably consist of advance type 1200 direct-current relays having a resistance of 1200 ohms each. Two other relays, 19 and 20, complete the control group, both being ordinary alternating-current relays. Relay 19 may be an Allied type B; relay 20 should be an Allied type HRX.

Relays 21 and 22 receive energy for their operation directly from rectifier 13. These are wired in parallel, except that each has its own separate series resistor, 37 and 38, respectively. Either one or the other of these series resistors is always shorted out, depending upon the position of relay 19. Position of relay 19 is determined by position of relay 20 and by pulsating ground supplied by microswitch 33 as a result of rotation of cam 29. Accordingly, when relay 20 is operated (during the last half of the six-minute noise test and adjustment interval) a one-second pulse of transmitted ground in each fifteen-second time interval will operate relay 19 for about one-second duration during the pulse or "P-interval" and will remain unoperated for the intervening fourteen-second no-pulse or "NP-interval." During NP intervals relay 19 is in its released position, so that accordingly resistor 37 is shorted out. Under this condition, then, relay 21 will have applied to it the full generated voltage appearing at the output side of rectifier 13 due to present noise level. During P-intervals, on the other hand, the "short" is removed from resistor 37 and is transferred, instead, to resistor 38. Hence, during the one-second restore pulse of the P-interval (which occurs once in each fifteen-second period only during the last three minutes of each noise test and adjust period) the current through relay 21 is reduced by about 15 per cent to permit it to drop into its released position if the current prior to the P-interval had just been at the "operate" value, and in addition the current through relay 22 is now raised by being allowed to flow exclusively through the relay due to the short across resistor 38. Relay 22 is adjusted to operate at a current value slightly (say 2.5 per cent) below that specified for relay 21. As example, relay 22 might be adjusted at its minimum permissible requirement, allowing a 15 per cent variation between its operate and release values. Then relay 21 would be adjusted to operate at a current 2½ per cent higher than that at which relay 22 will operate, and release at a value 15 per cent below its operate value. Resistor 38 must now be made large enough so that a 5 per cent drop in voltage across the output side of rectifier 13 from that value at which precisely the "operate" value of current will flow through relay 21 (during an NP-interval), will cause precisely the release value of current for relay 22 to flow through it. With such adjustment procedure performed on the advance type 1200 relays having exactly 2200 ohms resistance each, the values of resistance for resistors 37 and 38 came out to be 400 ohms and 325 ohms, respectively.

For convenience in discussion it will be more useful to refer to applied direct-current voltage (meaning direct current applied to the relay circuit by rectifier 13). Minimum adjustment current requirement for relay 22 calls for 1.065 mils operate and 0.905 mil release. Consequently a 2½ per cent higher operate value for relay 21 calls for 1.093 mils. In each case the relay operates when its series resistor is shorted out so that the multiplication of current by relay resistance will give applied direct-current voltage. Thus relay 22 operates at applied voltage $$1.065\times10^{-3}\times2200=2.344 \text{ volts}$$

Relay 21 operates at applied circuit voltage $$1.093\times10^{-3}\times2200=2.403 \text{ volts,}$$

which is 2½ per cent (or about ¼ decibel) higher. Release of relay 22 occurs at applied circuit voltage $0.905\times10^{-3}\times(2200+325)=2.285$ volts, which is 2½ per cent (or about ¼ decibel) lower than the relay 22 operate voltage which was taken as a reference, or "normal" voltage, 2.344 volts.

Let us assume that microswitch 35 has just operated, so that relay 20 will have just been pulled up to start the last three minutes of the correction cycle, in which will alternate one-second P-intervals with fourteen-second NP-intervals due to pulsating ground supplied by switch 33 in riding cam 28 as described. Let us further assume that normal or reference voltage (as just defined: operate voltage of relay 22) exists across the relay circuit and that relay 19 has not yet operated. Resistor 37 is shorted. During the particular period so specified neither relay 21 nor relay 22 will be operated, and accordingly the armature of relay 21 will pass ground from relay 20 on to lead 24 via the armature of relay 22. Ground placed on lead 24 constitutes an order to motor 17 to turn in a direction to increase gain of the microphone channel, thereby increasing the voltage across the load circuit 13 at the rate of 2 decibels per minute. At the first pulse after operation of relay 20, the operation of relay 19 by this pulse will transfer the short from resistor 37 to resistor 38, whereupon relay 22 will operate and thereby remove ground from lead 24. If the initial interval preceding the first pulse happened to be relatively long (approaching a fourteen-second maximum) somewhat more than ¼ decibel of gain chage in the microphone channel could be produced were it not for the fact that relay 21 will operate when ¼ decibel change has occurred, and by transferring ground from lead 24 to lead 23 produces an opposite rotation of motor 17 which then continues to lower the rectifier circuit voltage until the next pulse occurs. Thus in the initial interval it is possible to get no more than ¼ decibel change in gain before normal cyclic functioning of the group 18 circuit takes over.

Thereafter, during each pulse or P-interval, relay 22 will operate when applied rectified voltage at that time is 2.344 (reference, or normal) or higher. During an NP-interval, relay 22 will remain operated, if operated during the preceding P-interval, unless applied voltage drops to 2.285; relay 21 will operate provided applied voltage becomes 2.403 or higher. After the initial interval, then, an applied circuit voltage of 2½ per cent above normal or higher is identified with operation of relay 21 and the resultant placing of ground on lead 23. Similarly an applied circuit voltage 2½ per cent below normal or lower is identified with release of relay 22 and the placing of ground on lead 24. Accordingly a "normal" applied circuit voltage is identified with operation of relay 22 and the prevention of ground from reaching lead 24 as well as release of relay 21 and corresponding failure of ground to reach lead 23. Thus, in the manner described, relays 21 and 22, which are ordinary plate circuit relays having an operate to release differential of no better than 15 per cent are able, due to the novel circuit in which they are used, to selectively call for upward or downward correction of gain on inputs differing by no more than ±¼ decibel (±2½ per cent) from a normal value which calls for no correction whatever.

The motor 17, whose rotation is controlled in the described manner, is shown on Fig. 1 as being directly coupled to the shaft linking the potentiometers of amplifier 7 with end stop switching arrangement 26. Actually, of course, a large amount of gearing down is desirable between the motor armature and the indicated shaft. If the motor has sufficient internal gearing, the portrayal of Fig. 1 is exact.

The potentiometer units shown may be, for example, Clarostat Manufacturing Company items, one having a type Y and one a type W taper. The type Y taper is suitable for the microphone or noise test channel, providing a linear 25-decibel variation between 90.0 per cent and 47.3 per cent points of maximum rotation, the resulting range of rotation being 42.7 per cent of maximum. End stop cams are adjusted on the shaft so that only the indicated potentiometer range can be traversed. The type W potentiometer will give a suitable characteristic for the program channel if used with a series ground resistor of 3 per cent of maximum potentiometer resistance, and if a 42.7 per cent range of rotation is selected between its 33.5 per cent and (33.5+42.7=) 76.2 per cent points of effective rotation. Alignment is secured by making the type W potentiometer rest on its 33.5 per cent point when the type Y potentiometer is at its corresponding 90 per cent (end of travel) point. These quoted numbers were selected so that while the microphone channel gain varies linearly with rotation over a range of 25 decibels, the program channel gain varies inversely over a range of between 15 and 16 decibels, the rate of change tapering off at the higher program channel gains according to practice found highly desirable.

Figure 2:
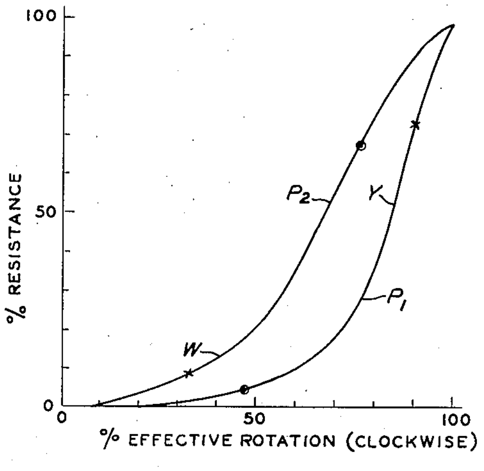
Fig. 2 shows characteristics of certain commercal potentiometers suitable for use in the gain controls of the invention.

Fig. 2 shows characteristics of these tapers in terms of per cent total resistance included between ground terminal and brush versus per cent effective brush rotation away from that terminal. Crosses indicate corresponding settings of the brushes on potentiometers $P_1$ and $P_2$ at noise threshold level; circles, corresponding brush positions on these potentiometers at the maximum noise level accommodated by the system.

Rectifier 13 contains considerable detail pertinent to the successful operation of the described system. Whereas the control system described is designed always to adjust noise channel gain for a constant normal direct-current output from rectifier 13, and accordingly the average input thereto would also be substantially constant, nevertheless circumstances can arise where relative constancy of average input is not true, and where input may be so high that protective measures are of utmost necessity. For instance, if the system has been shut down during an extremely quiet period, and should perchance be started up again during a period of extreme noisiness, the input level to the rectifier could conceivably be 40 decibels or more above normal. Under this violently excessive condition no damage must occur. Accordingly rectifier block 13 contains apparatus identified as follows: 39 is a potentiometer of high power handling capacity, which is used for setting rectifier output voltage at reference or "normal" value when the microphone potentiometer is at its high gain end of travel, and when listening area noise is at control threshold (say at 10 decibels above minimum room noise). Transformer 40 steps up the impressed noise voltage to a sufficiently high value so that when condensers 43 are charged through charing resistor 42 and varistors 41, 41′ in a voltage doubler arrangement, the resulting unidirectional condenser voltage shall have a value proportional to average noise level in the listening area. Resistors 44, 44′ and varistor 45 are included to provide the desired safety feature. That is, in the region of normal rectifier input and output strict proportionality to average noise extends all the way to the voltage applied across the control relay circuit, whereas at rectifier inputs considerably in excess thereof this proportionality is lost, and voltage applied across sensitive relays 21 and 22 can therefore never become excessive.

Potentiometer 39 may be an ordinary heavy duty wire wound potentiometer having voice coil impedance. Transformer 40 may be a regular output transformer normally designed to match plate impedance to speaker voice coil impedance. Varistors 41, 41' may comprise selenium rectifier units such as are sold as replacements instead of tubes in conventional power packs. Series charging resistor 42 may be 1000 ohms. Condensers 43 may each comprise a parallel pair of 500-microfarad electrolytic condensers such as Mallory HC type 2005. Resistors 44, 44' may be 500 ohms each. The load circuit, consisting of either relay 21 plus 400 ohms in parallel with relay 22 or relay 22 plus 325 ohms in parallel with relay 21, either combination approximately 680 ohms, is shunted by varistor 45, which may consist of twenty-four ¾-inch copper oxide varistor elements in series and at normal output have roughly equal shunting resistance (680 ohms). Accordingly the shunted load resistance may approximate 340 ohms at normal output. Hence 340/1340, or about 25 per cent of the developed condenser voltage will appear across the relay circuit under normal operating conditions. Condenser 46 may be an ordinary electrolytic condenser of 40 microfarads or higher, since its function is to stabilize the otherwise slightly fluctuating load impedance so that correct operating voltage shall be applied to relays 21 and 22 at all times.

Preamplifiers 6 and 12 use tubes $V_1$ and $V_2$, respectively, which may be 6J7's in pentode connection. Gain control and mixer amplifier 7 uses a double triode $V_3$, which may be a 6N7. Power amplifier 8 comprises a phase inverter stage utilizing tube $V_4$, which may also be a 6N7, and an output stage comprising tubes $V_5$ and $V_6$, which may be 42's in push-pull triode connection for the minimum system here described. Feedback from the output side of the output transformer $T_2$ may be suitably introduced in the grid circuit of $V_4$.

To give the system its initial alignment all that is necessary is to make certain adjustments at a time when a sound level meter indicates the ambient listening area noise to be about 10 decibels above minimum. This will presumably be about 50 decibels above reference noise (not reference output). With the microphone placed in desired position, and with the microphone channel potentiometer set in top gain position, potentiometer 39 is slowly adjusted upward until reference (normal) voltage appears across the relay 21 and 22 circuit during the last half of each correcting cycle. It is preferable to leave potentiometer 47 in preamplifier 12 near its maximum gain position during the adjustments, using it only as a vernier adjustment if necessary. This done, program material of average level is played over the program channel, potentiometer 48 in preamplifier 6 being adjusted to give a satisfactory program level under the condition of limited noise existing during this alignment period. This completes the required adjustments and the system is ready to operate.

Figure 3:
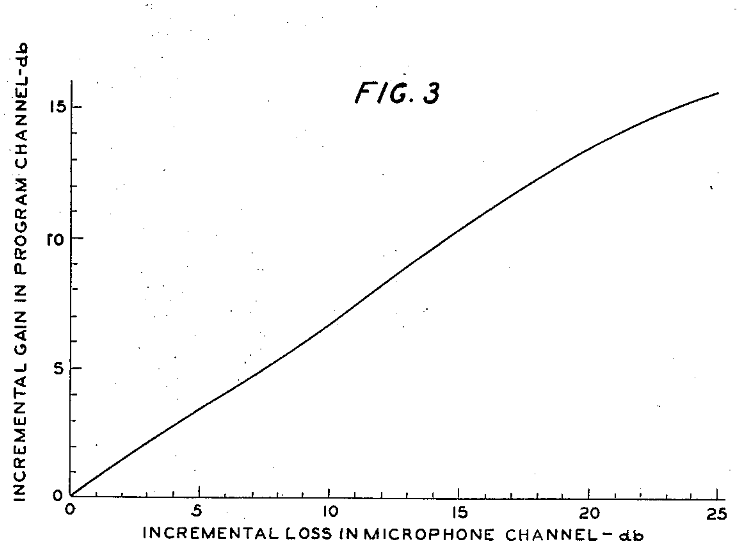
Fig. 3 shows the increase in program gain, and so in program sound level, with increase in noise level in the listening area.

Fig. 3 shows the computed over-all performance of the system in terms of increment in program channel gain versus increment in noise level, the latter quantity shown as the increment of loss introduced by motor 17 into the microphone channel in response to increasing noise level. Here the zero of abscissae is the gain of the microphone channel, the brush of potentiometer $P_1$ standing at the 90 per cent position, at noise threshold level; the zero of ordinates is the gain, at noise threshold level, of the program channel, the brush of potentiometer $P_2$ standing at the 33.5 per cent position.

The initial adjustment of the system is made after a suitable place has been chosen for the noise pick-up; this is a position where the noise microphone is exposed chiefly to the noise source most disturbing to the enjoyment of the program. The 25-decibel range of noise variation which the invention is to correct for is preferably from the selected threshold noise level upward.

The actual noise range in the listening area may vary from, say, 40 to 90 decibels above the reference level of commercial noise level meters. It is convenient to choose the noise threshold at 50 decibels above this reference level of $10^{-16}$ watt/square centimeter, tolerating initially a certain amount of disturbance. When, in the absence of program sound, a noise level meter reads 50 decibels tap 50 on potentiometer 47 in microphone preamplifier 12 is so adjusted that motor 17 drives to the permitted maximum gain of the microphone channel. This is done when the system is supplied with power and the Telechron timer operating, switches $S_1$, $S_2$ and $S_3$ closed but switch $S_4$ is open, so that no motion of the turntable takes place. Common gain control 51 at the input of phase inverter tube $V_4$ should be set high enough to permit a convenient range of adjustment of tap 50. In this adjustment, motor 17 has driven to minimum permitted gain the program channel.

The timer continues, to disable presently the microphone channel. Switch $S_4$ is now closed and the program gain manually adjusted at tap 52 to provide a sound level in the listening area satisfactorily high in the presence of the 50-decibel noise level. From this time on, the operation of the system needs no manual interference until the record changer has exhausted the stock of records.

As earlier stated, motor 17 brings about gain changes at the rate of 2 decibels per minute in the microphone channel gain, and 1.2 decibels per minute in that of the program channel. Since the first three minutes of the interval between programs is devoted to changing condenser 46 to the noise representative voltage, gain changing is limited to the last three minutes of the interval, so that the greatest gain change in any interval is 6 decibels and 3.6 decibels in microphone channel and program channel, respectively. Noise level changes greater than this must wait for the next correcting cycle of the timer.

Since a noise level change of 25 decibels is accompanied by a program level change of only 15 decibels, and a greater noise level change is not accommodated by the particular arrangement chosen for illustration of the invention, when the noise level rises to 75 decibels above reference level the signal noise ratio in the listening area becomes 10 decibels less than it was at the 50-decibel noise level. Further increase in noise finds the system specifically described incapable of further response; at these high noise levels it is for many practical reasons undesirable to drive the loudspeakers to sound levels overriding the noise.

The noise voltage rectifier 13 is in a circuit of such time constant as effectively to weight the noise level variations during the last half of the correcting interval, thereby making the gain adjustment of the program channel a function of the noise level just preceding the commencement of a program. It thus takes account of the noise level change accumulated since the end of the preceding program.

If four programs, each approximately six minutes long, are recorded on each disc, and the record changer handles ten discs, eight hours of automatic operation is provided for. The sequence of events, during a time interval overlapping a complete cycle, is as follows, taking the time of beginning of a program as zero and minutes as units:

| Time | Operation |
|---|---|
| −3 to 0 | Last half of correcting interval; weighted noise voltage at output of rectifier 13; motor 17 responds in twelve fifteen-second intervals; program channel and record drive disabled. |
| 0 to 6 | Program interval; microphone channel disabled; program reproduced at gain set just prior to time 0. |
| 6 to 9 | First half of correcting interval; microphone channel enabled to charge rectifier 13; program channel and record drive disabled. |
| 9 to 12 | Last half of correcting interval; operation as from −3 to 0. |

The embodiment of the invention herein described is a system suitable for a small listening area, and the accommodated range of noise level variations, likewise the ratio of program gain change to noise level change, is a practical one. It is, of course, possible to design potentiometers $P_1$ and $P_2$ for any desired noise range and ratio of gain changes. Also in various places in the system, equivalents are known or readily devised for the apparatus particularly disclosed without departing from the spirit of the invention. Aside from novel subcombinations, the invention provides an interval-adjusting automatic sound program volume control system in which the program sound level is dependent on conditions just preceding the beginning of the program.

It will be recognized that the rectification of the amplified noise voltage makes it easy to provide a time-constant circuit smoothing out fluctuations in that voltage. If that feature were not desired, it would be possible to dispense entirely with circuit 13 and apply the alternating noise voltage directly to a pair of alternating-current relays replacing relays 21 and 22. The value of alternating voltage maintained substantially constant would again be the operate value of the relay replacing relay 22 in the circuit of Fig. 1.

Moreover, the relay group 18 will serve to maintain an amplified voltage within 2½ per cent of a normal value where any initial voltage is amplified in a channel including a gain control operable by a motor such as 17 in Fig. 1, whether the control is confined to a particular time interval, as here, or not. Relay 20 may in the latter case be omitted, preserving, however, the intermittent grounding of the side of the winding of relay 19 which in the circuit of Fig. 1 is connected to the armature of relay 20.

What is claimed is:

1. For a sound program reproducing system including a gain control and reproducing sound programs in a noisy listening area, a system of apparatus for controlling the gain of the program system in accordance with the noise level in the area preceding the rendition of a program comprising a microphone generating an alternating voltage of magnitude corresponding to the noise level, an amplifier including a gain control for amplifying the generated voltage, a mechanical interconnection for operating simultaneously and in opposite senses the gain controls, means for rectifying the amplified voltage, a reversible motor controlling the interconnection, a source of power for the motor, means responsive during a program-preceding interval to variation in the rectified voltage from a selected magnitude thereof for applying the source of power to drive the motor controlling the interconnection in the direction reducing the variation and means continuously controlled by the source of power for disabling the reproducing system during a program-preceding interval and disabling the gain-controlling system during a program reproduction.

2. A system of apparatus as in claim 1 wherein the gain change in decibels in the program system is a proper fraction of the opposite simultaneous gain change in decibels in the gain-controlling system.

3. A system of apparatus as in claim 2 wherein the voltage rectifying means includes means for limiting the increase in the rectified voltage with increase in noise level above a selected value.

4. A system of apparatus as in claim 3 wherein the voltage rectifying means includes a time-constant circuit for smoothing time fluctuations in the rectified voltage.

5. A system of apparatus as in claim 1 including means for disabling the motor at selected settings near the limits of decrease and of increase, respectively, of program system gain.

6. A gain-controlling system as in claim 1 wherein the reversible motor has a rotor winding connected at one side to the source of power and at the other side to the mid-point of a stator winding and the means responsive to variation in the rectified voltage includes four relays each having a winding and an armature, the first relay having a first armature connected to one side of the winding of the second relay and two additional armatures connected respectively to the armatures of the second and third relays, the one side of the winding of the first relay being connected to a first contact adapted to be grounded during the later part of an interval between successive programs while the other sides of the windings of the first and second relays are connected to the source of power, the first relay operating when the first contact is grounded to ground the additional armatures and to connect its first armature to a second contact adapted to be intermittently grounded to operate the second relay, the armature of the second relay operating between a first pair of contacts connected respectively to the windings of the third and fourth relays at one side thereof, the other sides of the last-named windings being jointly connected to the voltage rectifying means, a resistance connected between ground and the one side of the third relay, a less resistance connected between ground and the one side of the fourth relay, the third and fourth relays operating at rectified voltages across their windings respectively greater than and equal to a selected magnitude, the armature of the second relay when the additional armatures are grounded normally applying ground to the one side of the winding of the third relay and transferring ground, when the second relay is operated, to the one side of the winding of the fourth relay, the armature of the third relay operating between a second pair of contacts connected one through a first switch to one side of the stator winding and applying ground thereto when the first and third relays only are operated and the other to the armature of the fourth relay, the armature of the fourth relay when released being connected through a second switch to the other side of the stator winding and applying ground thereto when the first relay only is operated, the application of ground through the first or the second switch applying the source of power to drive the motor to decrease or increase, respectively, the gain of the gain control channel, means for grounding the first contact throughout the later part of an interval between successive programs, means for intermittently grounding the second contact and means for controlling the operation of both grounding means.

7. In a sound program reproducing system comprising a program reproducing channel and a volume control channel, each channel including a preamplifier comprising a thermionic vacuum tube having at least a cathode, a control grid, an anode and a cathode resistor normally biasing the tube to cut-off, an amplifying system having an input circuit and an output circuit, the input circuit being coupled jointly to the anodes, a loudspeaker, a voltage rectifying circuit, a first relay having a winding and a grounded armature operating between a first pair of contacts individually connected to intermediate points on the cathode resistors, a second relay having a winding in parallel with that of the first relay and an armature connected to the output circuit and operating between a second pair of contacts of which one connects to the loudspeaker and the other to the rectifying circuit, the first relay when energized or deenergized operating its armature to short a part of the cathode resistor of the program channel or of that of the control channel, respectively, the second relay when energized or deenergized operating its armature to connect the output circuit to the loudspeaker or to the rectifying circuit, respectively, and power supply for the loudspeakers including switching means for energizing or deenergizing the relays simultaneously, thereby disabling alternatively the control channel and the program channel.

8. In a system of the class described including means for amplifying a varying alternating voltage, gain-controlling means for increasing or decreasing the amplification, means for rectifying the amplified voltage and supplying the rectified voltage to a pair of terminals of which one is grounded, a three-terminal reversible motor operating the gain-controlling means, and a source of power grounded at one side and connected at the other side to one terminal of the motor, the second and third terminals when grounded effecting motor motion to increase and decrease, respectively, the amplification, means for maintaining during a desired interval the rectified voltage substantially constant at a selected value comprising means responsive to variation of the rectified voltage above or below the selected value to apply the power source to the motor to operate the gain-controlling means in the direction reducing the variation, said responsive means including a first and a second relay of like character having each a winding and an armature, one side of each winding being connected to the ungrounded terminal while the other side is connected to ground through a resistance, the resistance being less for the first relay than for the second, the relays being so adjusted that the operate voltage of the first relay equals while that of the second relay exceeds the selected value, the armature of the first relay when deenergized connecting with a second terminal of the motor, the armature of the second relay operating between a first pair of contacts connected one to the armature of the first relay and the other to the third motor terminal, the armature making said other contact when the second relay is energized, a second pair of contacts connected individually to the other sides of the windings of said relays, a third relay having an armature operating between the contacts of the second pair and a winding connected at one side to the ungrounded side of the power source, the armature of the third relay connecting with the other side of the winding of the first or of the second relay when the third relay is energized or deenergized, respectively, a fourth relay having a winding connected at one side to the ungrounded side of the power source and adapted to be grounded at the other side and having a first, a second, and a third armature connected respectively to the other side of the winding of the third relay, to the armature of the second relay and to that of the third relay, the fourth relay when energized operating its first armature to a contact adapted to be intermittently grounded and its second and third armatures each to a grounded contact and switching means operated by the power source for intermittently grounding the contact therefore adapted and for grounding during the desired interval the winding of the fourth relay.

9. Voltage-controlling means as in claim 8 including a first switch in series between the armature of the first relay and the second motor terminal, a second switch in series between the other of the first pair of contacts and the third motor terminal, and means operated by the gain-controlling means to open the first and the second switch at selected limits of gain increase and decrease, respectively.

10. In an electrical system including means for amplifying a varying alternating voltage, gain-controlling means for increasing or decreasing the amplification, means for rectifying the amplified voltage and supplying the rectified voltage to a pair of terminals of which one is grounded, a three-terminal reversible motor operating the gain-controlling means, and a source of power grounded at one side and connected at the other side to one terminal of the motor, the second and third terminals when grounded effecting motor motion to increase and decrease, respectively, the amplification, means for maintaining the rectified voltage substantially constant at a selected value comprising means responsive to variation of the rectified voltage above or below the selected value to apply the power source to the motor to operate the gain-controlling means in the direction reducing the variation, said responsive means including a first and a second relay of like character having each a winding and an armature, one side of each winding being connected to the ungrounded terminal while the other side is connected to ground through a resistance, the resistance being less for the first relay than for the second, the relays being so adjusted that the operate voltage of the first relay equals while that of the second relay exceeds the selected value, the armature of the first relay when deenergized connecting with a second terminal of the motor, the armature of the second relay operating between a first pair of contacts connected one to the armature of the first relay and the other to the third motor terminal, the armature making said other contact when the second relay is energized, a second pair of contacts connected individually to the other sides of the windings of said relays, a third relay having an armature operating between the contacts of the second pair and a winding connected at one side to the ungrounded side of the power source, the armature of the third relay connecting with the other side of the winding of the first or of the second relay when the third relay is energized or deenergized, respectively, means for intermittently energizing the third relay and means for grounding the armatures of the second and third relays.

11. In an electrical system including means for amplifying a varying alternating voltage, gain-controlling means for increasing or decreasing the amplification, means for supplying the amplified voltage to a pair of terminals of which one is grounded, a three-terminal reversible motor operating the gain-controlling means, and a source of power grounded at one side and connected at the other side to one terminal of the motor, the second and third terminals when grounded effecting motor motion to increase and decrease, respectively, the amplification, means for maintaining the amplified voltage substantially constant at a selected value comprising means responsive to variation of the rectified voltage above or below the selected value to apply the power source to the motor to operate the gain-controlling means in the direction reducing the variation, said responsive means including a first and a second relay of like character having each a winding and an armature, one side of each winding being connected to the ungrounded terminal while the other side is connected to ground through a resistance, the resistance being less for the first relay than for the second, the relays being so adjusted that the operate voltage of the first relay equals, while that of the second relay exceeds the selected value, the armature of the first relay when deenergized connecting with a second terminal of the motor, the armature of the second relay operating between a first pair of contacts connected one to the armature of the first relay and the other to the third motor terminal, the armature making said other contact when the second relay is energized, a second pair of contacts connected individually to the other sides of the windings of said relays, a third relay having an armature operating between the contacts of the second pair and a winding connected at one side to the ungrounded side of the power source, the armature of the third relay connecting with the other side of the winding of the first or of the second relay when the third relay is energized or deenergized, respectively, means for intermittently energizing the third relay and means for grounding the armatures of the second and third relays.

WALTER F. KANNENBERG.

REFERENCES CITED

The following references are of record in the file of this patent:

UNITED STATES PATENTS

| Number | Name | Date |
|---|---|---|
| 2,338,551 | Stanko | Jan. 4, 1944 |
| 2,392,218 | Anderson | Jan. 1, 1946 |
| 2,420,933 | Crawford et al. | May 20, 1947 |
| 2,466,216 | Ekstrand | Apr. 5, 1949 |
| 2,486,480 | Kimball et al. | Nov. 1, 1949 |